United States Patent
Xie et al.

(10) Patent No.: US 8,736,301 B2
(45) Date of Patent: May 27, 2014

(54) SYSTEM ON CHIP AND CONTROL MODULE THEREFOR

(75) Inventors: Mingqin Xie, Suzhou (CN); Shayan Zhang, Tianjin (CN)

(73) Assignee: Freescale Semiconductor, Inc., Austin, TX (US)

(*) Notice: Subject to any disclaimer, the term of this patent is extended or adjusted under 35 U.S.C. 154(b) by 27 days.

(21) Appl. No.: 13/607,736

(22) Filed: Sep. 9, 2012

(65) Prior Publication Data

US 2013/0293261 A1   Nov. 7, 2013

(30) Foreign Application Priority Data

May 2, 2012 (CN) .......................... 2012 1 0195682

(51) Int. Cl.
- *H03K 19/173* (2006.01)
- *H01L 25/00* (2006.01)
- *G06F 17/50* (2006.01)

(52) U.S. Cl.
USPC .............................. 326/38; 327/566; 716/126

(58) Field of Classification Search
USPC ................ 326/37–41, 47, 101; 327/654–656; 716/100–139
See application file for complete search history.

(56) References Cited

U.S. PATENT DOCUMENTS

| | | | |
|---|---|---|---|
| 5,623,686 A | 4/1997 | Hall | |
| 5,705,938 A * | 1/1998 | Kean | 326/39 |
| 6,292,019 B1 * | 9/2001 | New et al. | 326/41 |
| 6,625,771 B2 | 9/2003 | Wright | |
| 6,868,201 B1 | 3/2005 | Johnson | |
| 7,116,131 B1 * | 10/2006 | Chirania et al. | 326/41 |
| 7,193,440 B1 * | 3/2007 | Schmit et al. | 326/47 |
| 2003/0025132 A1 * | 2/2003 | Tobey | 257/202 |
| 2003/0107908 A1 * | 6/2003 | Jang et al. | 365/51 |
| 2008/0065789 A1 | 3/2008 | Chiang | |
| 2009/0166679 A1 * | 7/2009 | Paternoster et al. | 257/203 |

* cited by examiner

*Primary Examiner* — Alexander H Taningco
*Assistant Examiner* — Dylan White
(74) *Attorney, Agent, or Firm* — Charles Bergere

(57) ABSTRACT

A System on a Chip (SoC) has a first set of switches, each having first terminals for routing SoC signals and a second terminal, and a second set of switches. Each switch of the second set of switches has third terminals for routing signals with the first set of switches, and a fourth terminal. A SoC control module defines a switching configuration, and includes a first memory portion for storing a first switching protocol for the first set of switches. This defines, for a switch of the first set of switches, an electrical path between one of the first terminals and the second terminal. A second memory portion stores a second switching protocol for the second set of switches, and defines, for a switch of the second set of switches, an electrical path between one of the third terminals and the fourth terminal.

18 Claims, 5 Drawing Sheets

SYSTEM ON CHIP AND CONTROL MODULE THEREFOR

BACKGROUND OF THE INVENTION

The present invention relates to a system on a chip (SoC) and a SoC control module, and more particularly, to a SoC control module for multiplexing pins of the SoC to internal modules and signals of the SoC.

SoCs can be provided in various types and sizes of packages. For example, one SoC design is provided in a package having 256 pins. In a typical arrangement, for each package pin, the SoC has a switch (such as a multiplexer) that allows any of four internal SoC signals to be connected to that pin to allow for external connection. Thus, each SoC pin may be multiplexed to support several functions and, in this conventional arrangement, this allows for a maximum of 4×256 (1024) signals to be routed between the package pins and the SoC circuit.

FIG. 1 illustrates a typical layout for such an arrangement, where the SoC has a series 100 of multiplexers 102a, 102b, 102c . . . 102m (collectively referred to 102). Each of the multiplexers 102 has a series of four inputs 104a to 104m (or collectively 104) for receipt of the SoC internal signals. Each multiplexer 102 also is provided with a respective output 106a to 106m, which outputs a signal received on one of the inputs 104 depending on the value on a the control line input 108a to 108m. Each of the control line inputs 108 is arranged to receive a 2-bit input signal that determines which of the four input signals is output. The multiplexers may also operate as demultiplexers for routing electrical signals from an external device through the pins to the components of the SoC. In such a case, the mux outputs 106a to 106m act as inputs of the demultiplexers, and the mux inputs 104a to 104m act as outputs of the demultiplexers.

However, design considerations may dictate a smaller package design, in which the number of package pins is reduced. For example, it is possible to have 32 pin/64 pin/144 pin/256 pin packages in a single product family. In such reduced-pin packages, only a reduced number of signals can be routed between the SoC circuit and the chip pins, which may cause significant design limitations. For instance, in a 32-pin package (and following the example of FIG. 1 where each multiplexer has four inputs for routing signals to/from the SoC components), a maximum of 4×32 (128) SoC signals can be connected with the package pins, and then other i/o cells of the SoC are unused since they cannot be connected to package pins. Further, each unused pad and its associated i/o cell, which may incorporate numerous electronic devices such as level shifters, digital drivers and electro-static discharge (ESD) protective circuitry, remains energized and consumes unnecessary electrical power.

Thus, existing techniques are less than optimal because of the restrictions discussed above. Accordingly, it would be advantageous to be able to more readily connect more SoC signals to package pins and overcome the limitations discussed above.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION OF THE INVENTION

Figure 1:
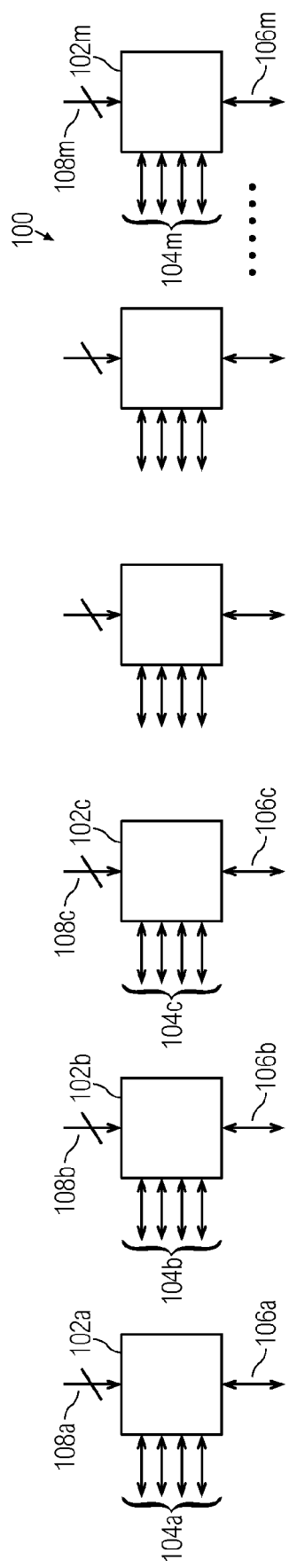
FIG. 1 illustrates a conventional arrangement for input-output switching in a system on chip (SoC)

In an embodiment of the invention, there is provided a system on chip control module for defining a system on chip switching configuration, the system on chip control module comprising: a first memory portion for storing a first switching protocol for a first set of switches of the system on chip, each switch of the first set of switches having: a plurality of first terminals for routing of electrical signals between the switch of the first set of switches and a system on chip component; and a second terminal; the first switching protocol defining, for a switch of the first set of switches, an electrical path between one of the plurality of first terminals and the second terminal; and a second memory portion for storing a second switching protocol for a second set of switches of the system on chip, each switch of the second set of switches having: a plurality of third terminals for routing of electrical signals between the first set of switches and the second set of switches; and a fourth terminal; the second switching protocol defining, for a switch of the second set of switches, an electrical path between one of the plurality of third terminals and the fourth terminal.

In another embodiment of the invention, there is provided a system on chip comprising: a first set of switches, each switch of the first set of switches having: a plurality of first terminals for routing of electrical signals between the switch of the first set of switches and a system on chip component; and a second terminal; a second set of switches, each switch of the second set of switches having: a plurality of third terminals for routing of electrical signals between the first set of switches and the switch of the second set of switches; and a fourth terminal; and a system on chip control module for defining a system on chip switching configuration, the system on chip control module comprising: a first memory portion for storing a first switching protocol for the first set of switches, the first switching protocol defining, for a switch of the first set of switches, an electrical path between one of the plurality of first terminals and the second terminal; and a second memory portion for storing a second switching protocol for the second set of switches, the second switching protocol defining, for a switch of the second set of switches, an electrical path between one of the plurality of third terminals and the fourth terminal.

In a further embodiment of the invention, there is provided a system on chip comprising: a first set of switches, each switch of the first set of switches having: a plurality of first terminals for routing of electrical signals between the switch of the first set of switches and a system on chip component; and a second terminal; a second set of switches, each switch of the second set of switches having: a plurality of third terminals for routing of electrical signals between the first set of switches and the switch of the second set of switches; and a fourth terminal; a system on chip control module for defining a system on chip switching configuration, the system on chip control module comprising a memory portion for storing a pad allocation protocol for the second set of switches, the pad allocation protocol defining whether a switch of the second set of switches is operative or inoperative.

Also disclosed is a method of controlling switching in a system on chip, the method comprising: providing a system on chip control module, the system on chip control module defining a system on chip switching configuration, and having a first memory portion and a second memory portion; controlling switching of a first set of switches of the system on chip using a first switching protocol stored in the first memory portion, a switch of the first set of switches having: a plurality of first terminals for routing of electrical signals between a system on chip component and the switch of the first set of switches; and a second terminal; and the first switching protocol defining an electrical path between one of the plurality of first terminals and the second terminal; and controlling switching of the second set of switches of the system on chip using a second switching protocol stored in the second memory portion, a switch of the second set of switches having: a plurality of third terminals for routing of electrical signals between the first set of switches and the switch of the second set of switches; and a fourth terminal; the second switching protocol defining an electrical path between one of the plurality of third terminals and the fourth terminal.

Also disclosed is another method of controlling switching in a system on chip, the method comprising: providing the system on chip with a first set of switches, each switch of the first set of switches having: a plurality of first terminals for routing of signals between the switch of the first set of switches and a system on chip component; and a second terminal; providing the system on chip with a second set of switches, each switch of the second set of switches having a plurality of third terminals for routing of electrical signals between the switch of the second set of switches and the first set of switches; and a fourth terminal; and providing the system on chip with a system on chip control module for defining a system on chip switching configuration, the system on chip control module comprising a first memory portion and a second memory portion: controlling switching of the first set of switches using a first switching protocol stored in the first memory portion, the first switching protocol defining, for the switch of the first set of switches, an electrical path between one of the plurality of first terminals and the second terminal; and controlling switching of the second set of switches using a second switching protocol stored in a second memory portion, the second switching protocol defining, for the switch of the second set of switches, an electrical path between one of the plurality of third terminals and the fourth terminal.

Also disclosed is another method of controlling switching in a system on chip, the method comprising: providing the system on chip with a first set of switches, each switch of the first set of switches having a plurality of first terminals for routing of electrical signals between the switch of the first set of terminals and a system on chip component; and a second terminal; providing the system on chip with a second set of switches, each switch of the second set of switches having a plurality of third terminals for routing of electrical signals between the first set of switches and the switch of the second set of switches; and a fourth terminal; providing the system on chip with a system on chip control module, the system on chip control module having a memory portion; and rendering a switch of the second set of switches operative or inoperative using a pad allocation protocol stored in the memory portion.

Yet further, also described is a method of selectively passing SoC internal signals to external pads comprising: defining a first switching protocol for a first set of switches and defining a second switching protocol for a second set of switches; and storing the first switching protocol in a first memory portion of a SoC control module and storing the second switching protocol in a second memory portion of the SoC control module; coupling SOC signals to a plurality of first input-outputs of the first set of switches; and coupling a plurality of the second switch input-outputs to a first set of input-output bonding pads; and coupling input-output signals from/to the first set of switches to/from a plurality of second input-outputs of the second set of switches; passing one of the plurality of first input-outputs of the first set of switches to/from a first switch input-output based upon said first switching protocol; and passing one of the plurality of second input-outputs of the second set of switches to/from a second set of input-output bonding pads based upon said second switching protocol.

Embodiments of the invention may provide significant technical benefits. For instance, introduction of a second (or higher) level of switching in a system on chip, where the switching configuration is defined by a system on chip control module allows for increased flexibility in padding out of system on chip signals as will become apparent. For instance, as electrical signals are routed between a first tier of SoC switches and multiple switches in the second tier, then signals can be routed between any of the switches in the first tier and any of the pads associated with the switches of the second tier. Thus, increased flexibility in padding out arrangements may be realized. And, further, in situations where the number of bonding pads is less than the number of SoC pins, SoC designers are able to take advantage of the ability to route more SoC signals on a limited number of pads with the introduction of a second (or further) level of switching.

Furthermore, embodiments of the invention allow for reduced wasted power in systems on chip in reduced-pin configurations as will be described in further detail below. For instance, in a conventional 256 pin SoC with a 32-pin pad out arrangement, a total of 224 pads are unused, and each of these consumes unnecessary power, an undesirable situation which may now be ameliorated with implementation of embodiments of the invention.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to distinguish between the elements such terms describe. Thus, these terms are not necessarily intended to indicate temporal or other prioritization of such elements.

Because the apparatus implementing the present invention is, for the most part, composed of components known to those skilled in the art, full technical details will not be explained in any greater extent than that considered necessary for the understanding and appreciation of the underlying concepts of the present invention and in order not to obfuscate or distract from the teachings of the present invention.

Some of the embodiments may be implemented using a variety of different switching devices. For example, although the description of the embodiments of the invention presented herein is given in the context of the switching devices being multiplexers, other types of switching devices may be implemented. The exemplary switching arrangements are presented merely to provide a useful reference in discussing various aspects of the invention.

The following exemplary description is given in the context of electrical signals being routed from one or more system on chip components to an external device. In the exemplary description, the switches are multiplexers operating so as to route one of multiple input signals to an output terminal. However, this arrangement is not limiting and in embodiments of the invention, electrical signals may be routed from the external device to the one or more system on chip components. In such arrangements, the switches may operate as demultiplexers so as to route one input signal to any of multiple output terminals.

Figure 2:
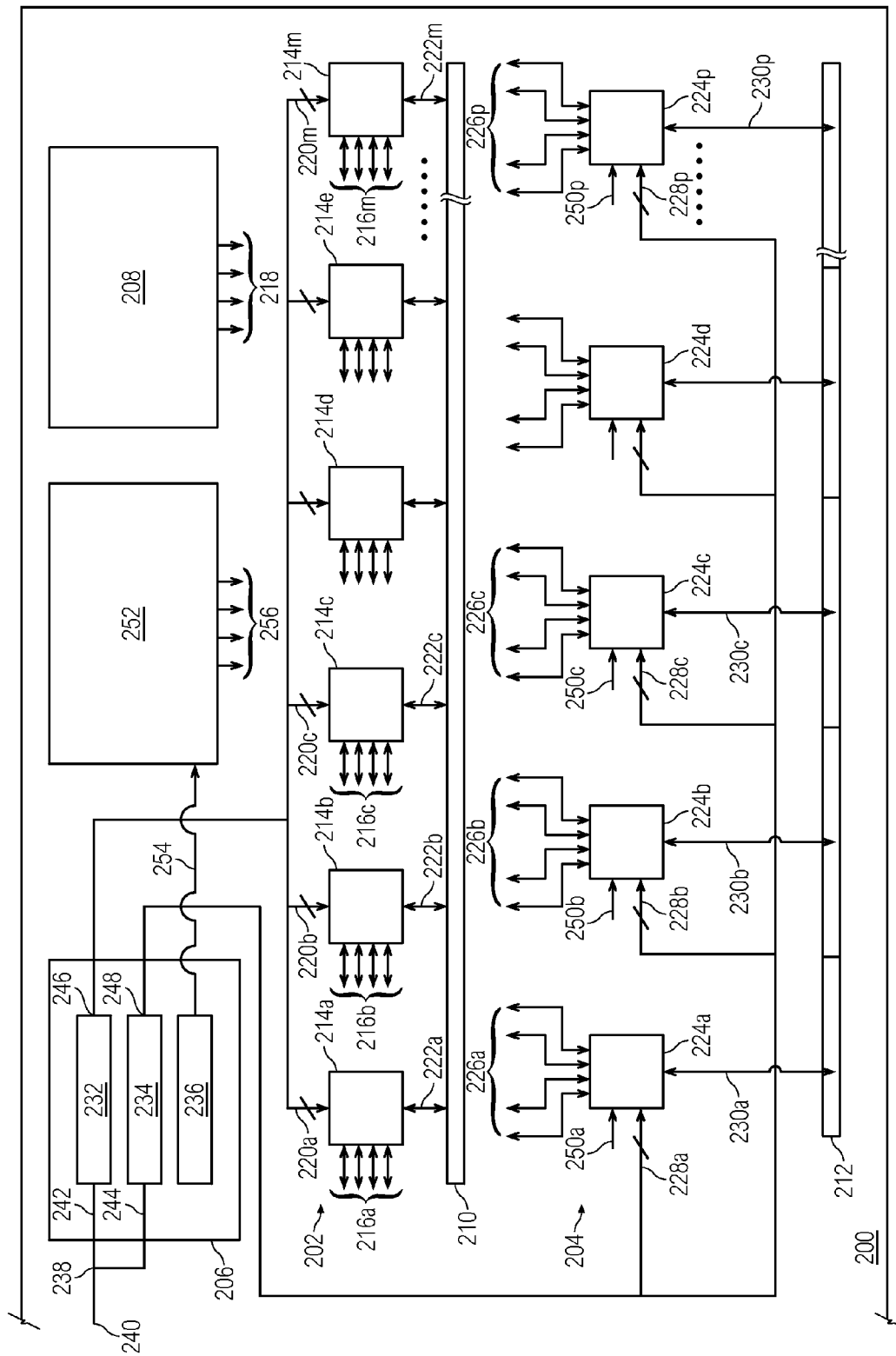
FIG. 2 is a schematic block diagram of a SoC switching arrangement in accordance with embodiments of the present invention.

Referring now to FIG. 2, a system on chip (SoC) and a SoC control module in accordance with embodiments of the invention are illustrated. SoC 200 comprises a first set of switches 202, a second set of switches 204, a SoC control module 206 and SoC components 208. The first set of switches 202 outputs signals to terminals 210. In the embodiment of FIG. 2, the terminals 210 illustrate schematically the output pins of the first set 202 of switches. The second set of switches 204 outputs signals to bonding pads 212, for routing to an external device (not shown).

The first set of switches 202 comprises individual switches 214a to 214m, each of which, in the embodiment of FIG. 2, are multiplexers but, as noted above, embodiments of the invention may be implemented utilizing other types of switches. Each individual switch 214 comprises, respectively, a plurality of first inputs 216a to 216m arranged to receive signals 218 from the SoC components 208, which signals 218 are for transmission to an external device (not shown). Each of the individual switches 214 has a control line input 220a to 220m, and the signal on this control line input determines which signal received on the plurality of first inputs 216a-216m is output on the first outputs 222a-222m.

The second set of switches 204 comprises individual switches 224a-224p each of which are multiplexers but, as noted above, embodiments of the invention may be implemented utilizing other types of switches. Each individual switch 224 comprises a plurality of second inputs 226a-226p arranged to receive output signals from the outputs 222 of the first set of switches 202.

The embodiment of FIG. 2 illustrates an exemplary scenario where there are two levels of switching, with the first set 202 of switches and the second set 204 of switches. It will be appreciated that embodiments of the invention may implement more than two levels of switching, and a third or even higher-order level of switching may be introduced to increase further the padding out options available to SoC designers.

In the embodiment of FIG. 2, there are a total of 256 switches 214 in the first set 202 of switches. That is, the suffix "m" for switch 214m denotes that this is the 256$^{th}$ switch in first set 202 of switches, one for each SoC pin. Also, there are a reduced number of bonding pads in comparison to the number (256) of SoC pins. In the embodiment of FIG. 2, there are total of (a maximum of) 144 bonding pads, and the suffix "p" for switch 224p denotes that this is the 144$^{th}$ switch in second set 204 of switches, one for each bonding pad. Of course, similar comments apply when the maximum number of bonding pads is different being, for example, 96 or 32.

When the maximum number of bonding pads is less than the SoC pin count, then the outputs of the first set of switches may be routed to the inputs of the second set of switches in an even or near-even distribution. For instance, if the number of maximum bonding pads is 144 and the SoC pin count is 256, then outputs 222a, 222b, 222c, 222d may be connected to the second inputs of switches 224a, 224b, 224c. Outputs 222e, 222f, 222g, 222h (not shown) may be connected to second inputs of switches 224d, 224e (not shown). Outputs 222i, 222j, 222k, 222l (not shown) may be connected to second inputs of switches 224f, 224g (not shown), and so on.

In the embodiment of FIG. 2, each of the outputs 222a, 222b, 222c, 222d of the switches 214a, 214b, 214c, 214d of first set 202 of switches is fed as an input 226 of each of switches 224a, 224b, 224c, 224d. That is, the inputs to each of switches 224a, 224b, 224c, 224d are the same four outputs 222a, 222b, 222c, 222d of switches 214a, 214b, 214c, 214d respectively. The same or similar configuration is applied across the remainder of first set 202 of switches for switches 214e, 214f, 214g, 214h (not illustrated) etc. and second set of switches, for switches 224e, 224f, 224g, 224h (not illustrated) etc.

Each of the individual switches 224 has a control line input 228a-228p, and the signal on this input determines which signal received on the plurality of second inputs 226 is output on second outputs 230a-230p of the individual switches 224 of the second set of switches 202, and then to the bonding pads 212 for onward routing to the external device (not shown).

As noted above, SoC 200 comprises a SoC control module 206. In the embodiment of FIG. 2, SoC control module 206 comprises a first memory portion 232 for storing a first switching protocol for the first set 202 of switches of SoC 200. SoC control module 206 further comprises a second memory portion 234 for storing a second switching protocol for the second set 204 of switches of SoC 200. SoC control module 206 further comprises a third memory portion 236 for storing a pad allocation protocol, which will be described in further detail below, and in particular with reference to FIGS. 4 and 5.

In the embodiment of FIG. 2, first and second memory portions 232, 234 are configurable through register access 238 of peripheral slave bus 240 of SoC 200. Thus, first memory portion 232 is configurable from register access 238 through input 242 of the first memory portion 232 and second memory portion 234 is configurable from register access 238 through input 244 of the second memory portion 234.

As can be seen in FIG. 2, the control line inputs 220 for the switches of the first set 202 of switches are supplied from the first memory portion 232 of SoC control module 206 from output 246 of first memory portion 232. Also, the control line inputs 228 for the switches of the second set 204 of switches are supplied from the second memory portion 234 of SoC control module 206 from output 248 of second memory portion 234. In this exemplary embodiment, as each switch of the first set 202 of switches and the switches of the second set 204 of switches has four inputs, two-bit signals are required to select which of these input signals is routed to the output. Of course, if different numbers of input signals are implemented, then a corresponding control line input signal must also be used. For example, if there are a total of (up to) eight inputs to any of the switches in the first set 202 or second set 204 of switches, then the signal on control line input 220 or 228 will be a three-bit signal.

As also illustrated in FIG. 2, each switch 224 of the second set 204 of switches has a power control line input 250a-250p for receipt of a pad allocation protocol signal.

Also illustrated in FIG. 2 is a power reduction control module 252, operated under control of third memory portion 236 of the SoC control module 206, and the signal(s) output on output 254 of third memory portion 236. Power reduction control module 252 has an output bus line 256, for provision of pad allocation protocol signals on power control line inputs 250a-250p of switches 224. Operation of third memory portion 236 of SoC control module 206/power control module 252 is discussed in greater detail below with reference to FIGS. 4 and 5.

Figure 3:
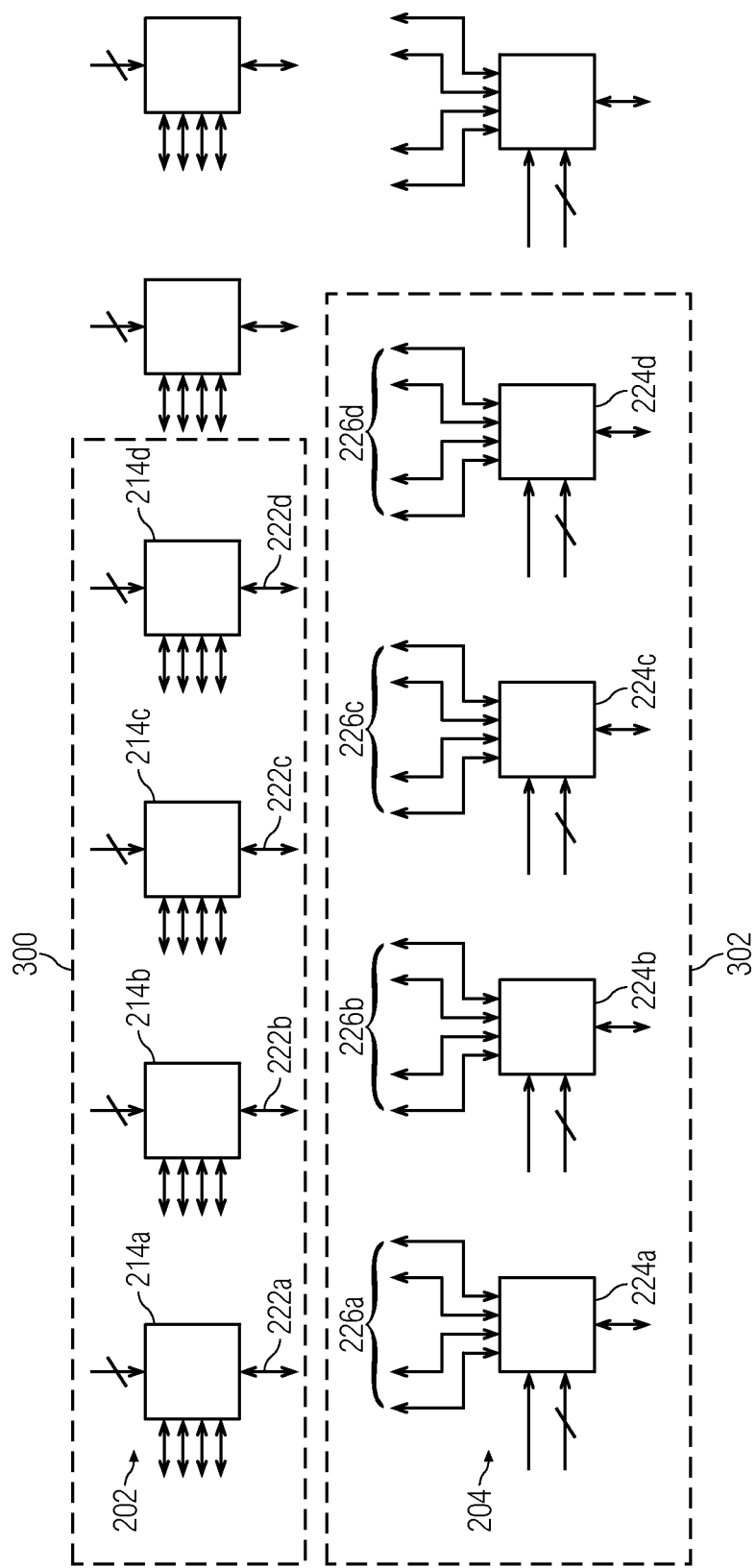
FIG. 3 is a schematic block diagram of a SoC switching arrangement in accordance with another embodiment of the present invention.

In operation, and as noted above, SoC components 208 have signals 218 for transmission to an external device (not shown) through bonding pads 212. These signals 218 are routed to the plurality of first inputs 216 of the first set 202 of switches of SoC 200. First memory portion 232 of SoC control module 206 stores a first switching protocol for the first set 202 of switches which defines which input signals 216 are output on first outputs 222. In the embodiment of FIG. 2, and taking switches 214a, 214b, 214c, 214d and switches 224a, 224b, 224c and 224d, then each of the first outputs 222 of switches 214a, 214b, 214c, 214d is routed as an input 226 to each of the switches 224a, 224b, 224c and 224d. That is, the signal on output 222a is routed as one of the inputs 226a, one of the inputs 226b, one of the inputs 226c, and one of the inputs 226d. The same can be said for any of the outputs 222b, 222c and 222d from, respectively, switches 214b, 214c, 214d. Furthermore, any of the output signals 222a, 222b, 222c and 222d are also routed as one of the inputs of switches 226b, 226c, 226d. Therefore, any of the four signals provided as inputs 216a, 216b, 216c, 216d can be output on any of second switch outputs 230a, 230b, 230c, 230d, therefore providing increased flexibility in padding out for the SoC designer. This may be illustrated better with reference to FIG. 3 which shows the first set of switches 202 comprising a first sub-group 300 of switches and the second set 204 of switches comprises a second sub-group 302 of switches, the outputs 222 of each switch 214 in the first sub-group 300 of switches being electrically connected to an input of the plurality of second inputs 226 of a switch 224, 224b, 224c, 224d in the second sub-group 302 of switches. Although the embodiment of FIG. 3 illustrates the switches being grouped together in sub-groups of four switches, it will be appreciated that sub-groups of other numbers of switches may also be used. Further, although in the embodiments of FIG. 2 and FIG. 3 the number of the plurality of first inputs 216 is the same as the number of the plurality of second inputs 226, this is not essential and different configurations may also be used.

Turning back now to FIG. 2, memory portion 232 of SoC controller 206 stores the first switching protocol which is output on output 246 of first memory portion 232 as control line inputs 220 of the switches of the first set 202. The first switching protocol defines which signal on input 216 of the switches 214 of first set 202 of switches is output on output 222. Second memory portion 234 of SoC controller 206 stores the second switching protocol which is output on outputs 248 of second memory portion 234 as control line inputs 228 of the switches of the second set 204. The second switching protocol defines which signal on input 226 of the switches 224 of second set 204 of switches is output on output 230 for transmission to the bonding pad 212. As noted above, first and second memory portions 232, 234 are configurable via register access 238 and the peripheral slave bus 240.

Operation of any of the remainder of the switches 214 (up to and including switch 214m) of the first set 202 of switches and any of switches 224 (up to and including switch 224p) of the second set 204 of switches is executed in the same (or a similar) way.

Thus, it will be appreciated that FIG. 2 illustrates a system on chip 200 comprising: a first set 202 of switches 214, each switch 214 of the first set 202 of switches having a plurality of first terminals 216 for routing of electrical signals between the switch of the first set of switches and a system on chip component 208; and a second terminal 222; a second set 204 of switches 224, each switch 224 of the second set 204 of switches having a plurality of third terminals 226 for routing of electrical signals between the first set 202 of switches and the switch of the second set 204 of switches; and a fourth terminal 230; and a system on chip control module 206 for defining a system on chip switching configuration, the system on chip control module 206 comprising: a first memory portion 232 for storing a first switching protocol for the first set 202 of switches, the first switching protocol defining, for a switch 214 of the first set 202 of switches, an electrical path between one of the plurality of first terminals 216 and the second terminal 222; and a second memory portion 234 for storing a second switching protocol for the second set 204 of switches, the second switching protocol defining, for a switch 224 of the second set 204 of switches, an electrical path between one of the plurality of third terminals 226 and the fourth terminal 230. A corresponding method of controlling switching in a system on chip has also been described.

Additionally, it will be appreciated that FIG. 2 illustrates a system on chip control module 206 for defining a system on chip 200 switching configuration, the system on chip control module 206 comprising: a first memory portion 232 for storing a first switching protocol for a first set 202 of switches of the system on chip 200, each switch 214 of the first set 202 of switches having a plurality of first terminals 216 for routing of electrical signals between the switch 214 of the first set 202 of switches and a system on chip component 208; and a second terminal 222; the first switching protocol defining, for a switch of the first set 202 of switches an electrical path between one of the plurality of first terminals 216 and the second terminal 222; and a second memory portion 234 for storing a second switching protocol for a second set of switches 204 of the system on chip 200, each switch 224 of the second set 204 of switches having: a plurality of third terminals 226 for routing of electrical signals between the first set 202 of switches and the second set 204 of switches; and a fourth terminal 230; the second switching protocol defining, for a switch of the second set 204 of switches, an electrical path between one of the plurality of third terminals 226 and the fourth terminal 230. A corresponding method of operating a system on chip control module has also been described.

Thus, system on chip control module 206 can be considered to be a "package aware" control module, since it is configured to account for the padding out arrangement to the package.

Further, embodiments of the invention allow for the same SoC 200 to be used across different products of a product family, where the different products have different numbers of bonding pads and/or a different arrangement of bonding pads. For instance, in addition to being able to cater for different numbers of bonding pads, embodiments of the invention cater for the bonding pads being different. In some embodiments, the location of the bonding pads can be different so that, for example, a first set of pads are configured as pad (0:255) for a 256-pad package, and a second set of pads may be pad (0:255:Odd) or pad (0:255:Even). Both of these latter sets of pads use a 128-pad configuration but connect to different pad locations: even-numbered pads or odd-numbered pads. In which case, the switching protocols, particularly the second switching protocol, are configurable for setting up the switching arrangement of the switches 224 in the second set 204 of switches to account for the final number and/or arrangement of bonding pads. Therefore, it will be appreciated that FIG. 2 also illustrates a system on chip control module 206 which is configurable to define the second switching protocol for when the system on chip 200 is arranged for routing of electrical signals between the second set 204 of switches and a first set of bonding pads 212 (for example, 256 bonding pads, the same as the number of pins of the SoC); and to define the second switching protocol for when the system on chip 200 is arranged for routing of electrical signals between the second set 204 of switches and a second set of bonding pads (not illustrated) (for example, 144 bonding pads), the first set of bonding pads being different from the second set of bonding pads.

In the embodiment of FIG. 2, first and second memory portions 232, 234 each comprise of a set of registers and may comprise of, for example, a set of 64 8-bit registers, a set of 32 16-bit registers, or a set of 16 32-bit registers, but other configurations may also be used. In an alternative embodiment, these memory portions 232, 234 are different portions of the same register. Of course, other types of memory may also be implemented including, for example, in another alternative embodiment, a volatile memory (not shown) into which instructions may be loaded from, say, a storage memory for execution under control of a processor (not shown), for implementing the switching protocols described above.

As noted above, embodiments of the invention may implement a pad allocation protocol (at least one pad allocation protocol) stored in third memory portion 236 of SoC control module 206. A pad allocation protocol determines whether a switch 224 of the second set 204 of switches is rendered operative (enabled and in operation) or inoperative (disabled, not consuming power). In embodiments of the invention where the number of bonding pads 212 is less than the number of SoC pins, a switch 224 may be rendered inoperative if it is associated with a bonding pad not in use. Thus, the pad allocation protocol stored in third memory portion 236 may be output therefrom to connect to inputs 250a-250p of switches 224. The manner in which the switches 224 may be rendered inoperative is discussed in greater detail with reference to FIG. 5

Figure 4:
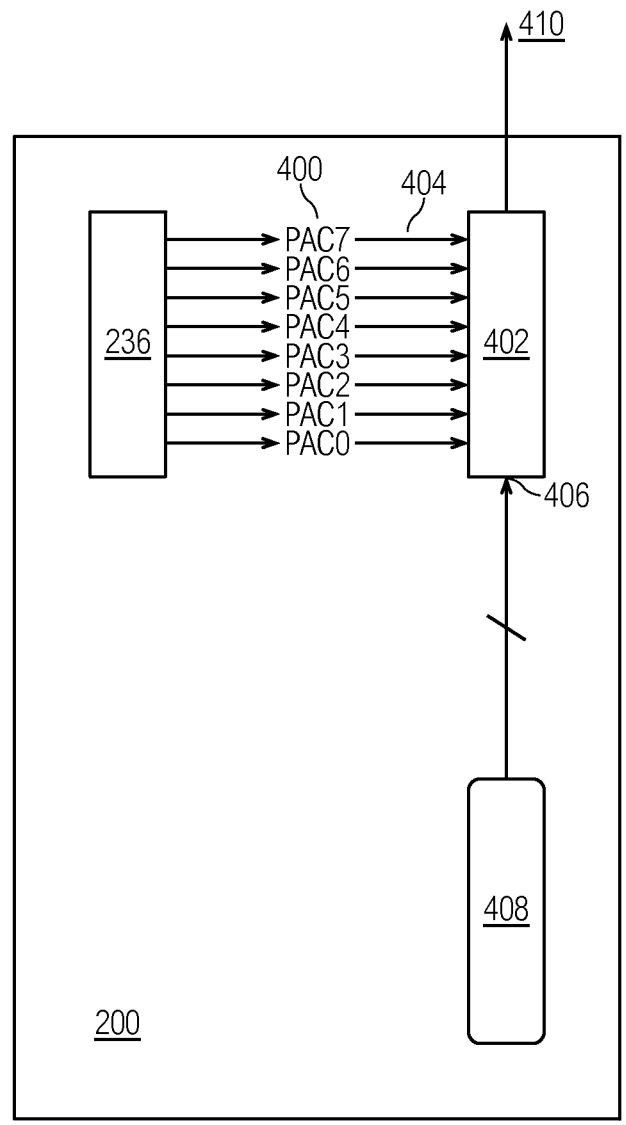
FIG. 4 is a schematic block diagram of a SoC switching arrangement that reduces unnecessary power wastage in a SoC in accordance with another embodiment of the present invention.

Referring now to FIG. 4, use of plural pad allocation protocols, as stored on third memory portion 236 of the SoC control module 206, will now be described which provides further flexibility as the padding out arrangement may be changed by selection of one of the plural pad allocation protocols. In the embodiment of FIG. 4, third memory portion 236 of SoC control module 206 stores multiple pad allocation protocols 400 in this case, a total of eight pad allocation protocols PAC0, PAC1, PAC2 . . . PAC7. Each of these pad allocation protocols 400 may be output from third memory portion 236 to a pad allocation protocol selector switch 402 (which may be part of the power reduction control module 252 on SoC 200), and received on inputs 404 thereof. Pad allocation protocol selector switch 402 has a control line input 406 for receiving an input control signal from another memory portion 408, which may be part of, or separate from, SoC control module 206. In the embodiment of FIG. 4, memory portion 408 is a non-volatile memory, a flash IFR ("Information Row", which is a specific portion of Flash which may be utilized to store system related information). In the embodiment of FIG. 4, pad allocation protocol selector switch 402 is also a multiplexer, and, as there are eight inputs 400 for receipt of the eight pad allocation protocols, pad allocation protocol selector switch control line input 406 is arranged to receive a three-bit signal from flash IFR 408. The selected pad allocation protocol 400 is output on output 410 of pad allocation protocol selector switch 402, for routing from the output 256 of power control module 252 to the inputs 250a-250p of second set 204 of switches.

Thus, it will be appreciated that FIG. 4 illustrates a control module 206 comprising a third memory portion 236 for storing a pad allocation protocol 400 for the second set 204 of switches, the pad allocation protocol 400 defining whether a switch 224 of the second set 204 of switches is operative or inoperative. Additionally, FIG. 4 illustrates a SoC 200, wherein the third memory portion 236 is configured to store a plurality of pad allocation protocols 400, and the SoC 200 further comprises a pad allocation protocol selector switch 402 for selection of one of the plurality of pad allocation protocols 400 to be applied to the second set 204 of switches.

Table 1 illustrates the form that the individual pad allocation protocols 400 may take, these being programmable to cater for the desired padding out arrangement, and the number of bonding pads to be used. In embodiments of the invention, these pad allocation protocols 400 are derived to provide even or near-even distribution amongst the pads in packages having less than 256 pads to facilitate electrical connection routing to the package. A "1" indicates the pad is to be bonded out and the associated switch 224 is to be operative. A "0" indicates the pad is not to be bonded out and the associated switch 224 is to be inoperative.

TABLE 1

| Code | Hex representation | No of pins | Binary representation |
|---|---|---|---|
| PAC0 | 16{16'hFFFF}; | 256 pin | (256'b1111111111111111 . . . ) |
| PAC1 | 16{16'hEAAA} | 144 pin | (256'b1110101010101010 . . . ) |
| PAC2 | 16{16'hA8A8} | 96 pin | (256'b1010100010101000 . . . ) |
| PAC3 | 16{16'hA888}; | 80 pin | (256'b1010100010001000 . . . ) |
| PAC4 | 16{16'h8888}; | 64 pin | (256'b1000100010001000 . . . ) |
| PAC5 | 16{16'h8080}; | 32 pin | (256'b1000000010000000 . . . ) |
| PAC6 | 16{16'h0000} | | Reserved |
| PAC7 | 16{16'h0000} | | Reserved |

Table 2 illustrates the options for the three-bit signal output by flash IFR 408 to input 406 of pad allocation protocol selector switch 402.

TABLE 2

| | |
|---|---|
| 000 | 256 pin |
| 001 | 144 pin |
| 010 | 96 pin |
| 011 | 80 pin |
| 100 | 64 pin |
| 101 | 32 pin |
| 110 | Reserved |
| 111 | Reserved |

When the switch is rendered inoperative, it is powered down to avoid any unnecessary power consumption by the switch for a pad which is not being used. In embodiments of the invention, the pad input-output cell associated with the pad (and/or associated with the switch) is also powered down. These arrangements are discussed below with reference to FIG. 5.

This feature of the switches of the second set 204 of switches being rendered operative or inoperative according to a pad allocation protocol 400 may be provided independently in which case it will be appreciated that FIG. 2 illustrates a system on chip 200 comprising: a first set 202 of switches, each switch 214 of the first set 202 of switches having a plurality of first terminals 216 for routing of electrical signals between the switch of the first set 202 of switches and a system on chip component 208; and a second terminal 222; a second set of switches, each switch of the second set of switches having a plurality of third terminals 226 for routing of electrical signals between the first set 202 of switches and the switch of the second set 204 of switches, and a fourth terminal 230; a system on chip control module 206 for defining a system on chip switching configuration, the system on chip control module 206 comprising a memory portion 236 for storing a pad allocation protocol 400 for the second set 204 of switches, the pad allocation protocol defining whether a switch 224 of the second set of switches is operative or inoperative.

Figure 5:
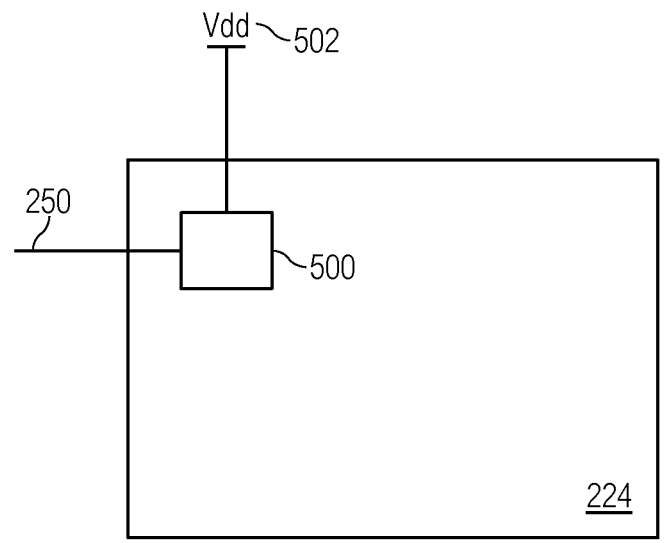
FIG. 5 is a schematic block diagram of an arrangement for reducing unnecessary power wastage in components of a SoC in accordance with an embodiment of the present invention.
Figure 5:
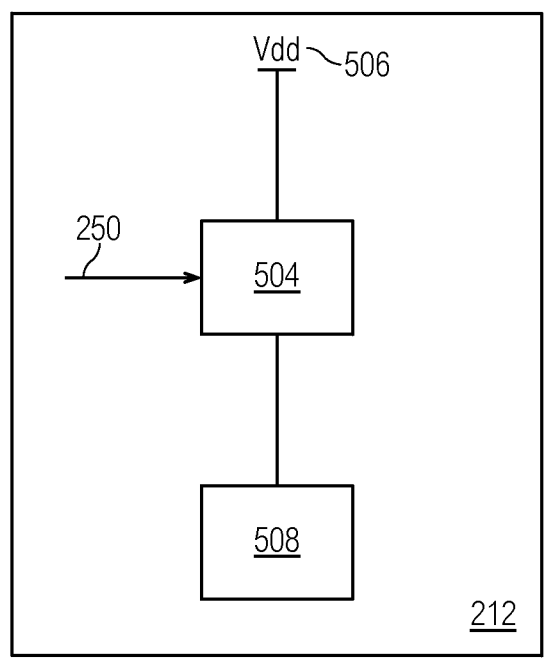

Referring to FIG. 5, the manner in which the switches 224 of the second set of switches may be rendered inoperative will now be described. As shown in FIG. 5, a switch 224 is powered from a switch power supply Vdd 502. A power isolation switch 500 is provided in the switch 224 of the second set 204 which is to be switched under control of the pad allocation protocol 400. Control of the power isolation switch 500 is then effected according to the pad allocation protocol 400, in accordance with the signal received on the power control line 250 of switch 224. In dependence of whether the switch 224 is to be operative or inoperative, power isolation switch 500 may be switched to connect or disconnect switch 224 from the switch power supply Vdd 502. Note that this operation is quite different from conventional operation of, say, a multiplexer switch in which a strobe (enable) function is provided to disable the multiplexer from its normal function, and to inhibit the multiplexer from passing data received on any of the inputs to the or each output. In embodiments of the invention, the power control lines 250 when set to a logical value of, say, zero will disable/disconnect the switch power supply Vdd applied to the multiplexer sells and, optionally, the corresponding pad input-output cells.

It will also be appreciated that the power for the switch 224 and for the pad/input-output cell 508 may be derived from a single power supply, rather than the individual power supplies 502, 506 illustrated in FIG. 5.

In an embodiment of the invention, the switch 500 (or 504 discussed below) is a PMOSFET transistor with its source node coupled to Vdd 502 (or Vdd 506 for switch 504), its drain node coupled to a power supply pin of second switch 224, and its gate node coupled to the logical complement (equivalent to insertion of an inverter) of power control line 250 of switch 224.

The operation of the switch control signal 250 is as follows. When the signal on line 250 is a logic High or a "1", the logical complement of that will be a Low or a "0", and the power switch is ON (in a conducting state) and the power supply connected to the switches and the corresponding pad I/O cells are connected.

When the signal on line 250 is a logic Low or a "0", the logical complement of that will be a High or a "1", and the power switch is OFF (in a non-conducting state) and the power supply applied to the multiplexer cells and the corresponding pad I/O cells is disconnected.

As illustrated in FIG. 5, power isolation switch 500 is provided as a part of switch 224. However, it will be appreciated that a separate power isolation switch 500, separate and distinct from switch 224, may be provided in the alternative.

Additionally, a power isolation switch 504 may be provided for switching of a pad power supply Vdd 506 with respect to an input-output cell 508 associated with the bonding pad (alternative, associated with the switch 224). Pad power isolation switch 504 may receive an input control signal from the pad allocation protocol 400 for control of switch 504.

Therefore, it will be appreciated that FIG. 5 illustrates a system on chip control module 206 being configured for the pad allocation protocol 400 to render the switch 224 of the second set 204 of switches inoperative by disconnecting the switch 224 from a switch power supply Vdd 502. Further, FIG. 5 illustrates a switch 224 of the second set 204 of switches comprising a power isolation switch 500, operation of the power isolation switch 500 being controlled by the system on chip control module 206 using the pad allocation protocol 400. Yet further, FIG. 5 illustrates the system on chip control module 206 being configured to render operative or inoperative an input-output cell 508 associated with the bonding pad and alternatively associated with the switch 224 of the second set 204 of switches. The system on chip control module 206 is configured to render an input-output cell 508 inoperative by disconnecting the input-output cell from an input-output cell power supply 506 through a power switch 504.

In simulations, it has been found that the introduction of the second (or further) level of switching does not cause unacceptable timing delays in the switching of the SoCs. Simulations were undertaken using a Pioneer3 k70 256 pin package as an example.

For Pioneer3 k70 256 pin package, there were 41 power pads, 49 DDR related pads, 34 analog pads, 132 normal functional pads. Padi_pioneer3 includes 49 DDR related pads, each having about 4 functions, 132 normal functional pads, each has about 10 functions. The gate count for pad-i_pioneer3 is 28832.

For 4 second-level multiplexers, using 1,812,888 Pioneer3 gates, the estimated added gates for the second level multiplexers were 28832×(132×4)/(49×4+132×10). The estimated added gates for the second switching protocol signals were 132×2×10. The estimated area increased percentage was 12682/1812888=0.7%. For 8 second-level multiplexers, using 1,812,888 Pioneer3 gates, the estimated added gates for the second level multiplexers were 28832×(132×8)/(49×4+132×10). The estimated added gates for the second switching protocol signals were 132×3×10. The estimated area increased percentage was 24043/1812888=1.3%. Thus it is found that the timing effect does not present any problems as it will add about 200 ps to 300 ps with second level switching added in cmos90TFS technology.

By now it should be appreciated that there has been provided novel techniques for controlling switching/signal routing in systems on chip. Further, a novel system on chip control module therefor has also been described.

Although the invention is described herein with reference to specific embodiments, various modifications and changes can be made without departing from the scope of the present invention as set forth in the claims below. For example, more than one additional level of switching/multiplexing may be used; that is, there may be two, three or more levels of switching in the system on chip. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The invention claimed is:

1. A System on a Chip (SoC) control module for defining a SoC switching configuration, the SoC control module comprising:

a first memory portion for storing a first switching protocol for a first set of switches of the SoC, each switch of the first set of switches having:

a plurality of first terminals for routing electrical signals between the switch of the first set of switches and a SoC component; and
a second terminal;
the first switching protocol defining, for a switch of the first set of switches, an electrical path between one of the plurality of first terminals and the second terminal; and
a second memory portion for storing a second switching protocol for a second set of switches of the SoC, each switch of the second set of switches having:
a plurality of third terminals for routing electrical signals between the first set of switches and the second set of switches; and
a fourth terminal;
the second switching protocol defining, for a switch of the second set of switches, an electrical path between one of the plurality of third terminals and the fourth terminal, wherein the SoC control module is configurable:
to define the second switching protocol when the SoC is arranged for routing of electrical signals between the second set of switches and a first set of bonding pads; and
to define the second switching protocol when the SoC is arranged for routing of electrical signals between the second set of switches and a second set of bonding pads, the first set of bonding pads being different from the second set of bonding pads.

2. The SoC control module of claim 1, wherein the control module is configured to control a switching configuration of the SoC when the first set of switches comprises a first sub-group of switches and the second set of switches comprises a second sub-group of switches, the second terminals of each switch in the first sub-group of switches being electrically connected to one of the plurality of third terminals of a switch in the second sub-group of switches.

3. The SoC control module of claim 1, wherein the SoC control module comprises a third memory portion for storing a pad allocation protocol for the second set of switches, the pad allocation protocol defining whether a switch of the second set of switches is operative or inoperative.

4. The SoC control module of claim 3, wherein the SoC control module is configured for the pad allocation protocol to render a switch of the second set of switches inoperative by disconnecting the switch from a switch power supply.

5. The SoC control module of claim 3, wherein the SoC control module is configured to render operative or inoperative an input-output cell associated with the switch of the second set of switches.

6. The SoC control module of claim 5, wherein the SoC control module is configured to render the input-output cell inoperative by disconnecting the input-output cell from an input-output cell power supply.

7. A System on a Chip (SoC), comprising:
a first set of switches, each switch of the first set of switches having:
a plurality of first terminals for routing of electrical signals between the switch of the first set of switches and a SoC component; and
a second terminal;
a second set of switches, each switch of the second set of switches having:
a plurality of third terminals for routing of electrical signals between the first set of switches and the switch of the second set of switches; and
a fourth terminal; and
a SoC control module for defining a SoC switching configuration, the SoC control module comprising:

a first memory portion for storing a first switching protocol for the first set of switches, the first switching protocol defining, for a switch of the first set of switches, an electrical path between one of the plurality of first terminals and the second terminal; and
a second memory portion for storing a second switching protocol for the second set of switches, the second switching protocol defining, for a switch of the second set of switches, an electrical path between one of the plurality of third terminals and the fourth terminal, wherein the SoC control module is configurable:
to define the second switching protocol for the second set of switches to route electrical signals between the second set of switches and a first set of bonding pads; and
to define the second switching protocol for the second set of switches to route electrical signals between the second set of switches and a second set of bonding pads, the first set of bonding pads being different from the second set of bonding pads.

8. The SoC of claim 7, wherein the first set of switches comprises a first sub-group of switches and the second set of switches comprises a second sub-group of switches, the second terminals of each switch in the first sub-group of switches being electrically connected to one of the plurality of third terminals of a switch in the second sub-group of switches.

9. The SoC of claim 7, wherein the SoC control module comprises a third memory portion for storing a pad allocation protocol for the second set of switches, the pad allocation protocol defining whether a switch of the second set of switches is operative or inoperative.

10. The SoC of claim 9, wherein the third memory portion is configured to store a plurality of pad allocation protocols, and the SoC further comprises a pad allocation protocol selector switch for selection of one of the plurality of pad allocation protocols to be applied to the second set of switches.

11. The SoC of claim 9, wherein the system on chip control module is configured for the pad allocation protocol to render the switch of the second set of switches inoperative by disconnecting the switch from a switch power supply.

12. The SoC of claim 11, wherein the switch of the second set of switches comprises a power isolation switch, operation of the power isolation switch being controlled by the system on chip control module using the pad allocation protocol.

13. The SoC of claim 9, wherein the system on chip control module is configured to render operative or inoperative an input-output cell associated with the switch of the second set of switches.

14. A System on a Chip (SoC), comprising:
a first set of switches, each switch of the first set of switches having:
a plurality of first terminals for routing of electrical signals between the switch of the first set of switches and a SoC component; and
a second terminal;
a second set of switches, each switch of the second set of switches having:
a plurality of third terminals for routing of electrical signals between the first set of switches and the switch of the second set of switches; and
a fourth terminal; and
a control module for defining a SoC switching configuration, the control module comprising a memory portion for storing a pad allocation protocol for the second set of switches, the pad allocation protocol defining whether a switch of the second set of switches is operative or inoperative, and wherein the SoC control module further is configurable:

to define the pad allocation protocol for the second set of switches to route electrical signals between the second set of switches and a first set of bonding pads; and to define the pad allocation protocol for the second set of switches to route electrical signals between the second set of switches and a second set of bonding pads, the first set of bonding pads being different from the second set of bonding pads.

15. The SoC of claim 14, wherein the memory portion is configured to store a plurality of pad allocation protocols, and the SoC further comprises a pad allocation protocol selector switch for selection of one of the plurality of pad allocation protocols to be applied to the second set of switches.

16. The SoC of claim 14, wherein the control module is configured for the pad allocation protocol to render the switch of the second set of switches inoperative by isolating the switch from a switch power supply.

17. The SoC of claim 14, wherein the switch of the second set of switches comprises a power isolation switch, operation of the power isolation switch being controlled by the control module using the pad allocation protocol.

18. The SoC of claim 14, wherein the control module is configured to render operative or inoperative an input-output cell associated with the switch of the second set of switches.

\* \* \* \* \*